(12) United States Patent
Murray

(10) Patent No.: US 10,417,862 B2
(45) Date of Patent: Sep. 17, 2019

(54) PROCESSES AND SYSTEMS FOR PLAYING GAMES VIA NFC TAG USAGE

(71) Applicant: Pouch Pac Innovations, LLC, Sarasota, FL (US)

(72) Inventor: R. Charles Murray, Sarasota, FL (US)

(73) Assignee: Pouch Pac Innovations, LLC, Sarasota, FL (US)

( * ) Notice: Subject to any disclaimer, the term of this patent is extended or adjusted under 35 U.S.C. 154(b) by 22 days.

(21) Appl. No.: 15/174,215

(22) Filed: Jun. 6, 2016

(65) Prior Publication Data

US 2016/0354684 A1 Dec. 8, 2016

Related U.S. Application Data

(60) Provisional application No. 62/171,298, filed on Jun. 5, 2015.

(51) Int. Cl.
*G07F 17/32* (2006.01)
*A63F 13/332* (2014.01)
*A63F 13/61* (2014.01)
*A63F 13/95* (2014.01)

(52) U.S. Cl.
CPC ........ *G07F 17/3225* (2013.01); *A63F 13/332* (2014.09); *A63F 13/61* (2014.09); *A63F 13/95* (2014.09); *G07F 17/3223* (2013.01); *G07F 17/3248* (2013.01); *G07F 17/3253* (2013.01); *G07F 17/3255* (2013.01)

(58) Field of Classification Search
CPC ..................................................... G07F 17/329
See application file for complete search history.

(56) References Cited

U.S. PATENT DOCUMENTS

| 5,709,603 | A | * | 1/1998 | Kaye | G07F 17/32 |
| | | | | | 273/138.2 |
| 2006/0246984 | A1 | * | 11/2006 | Walker | G07F 17/32 |
| | | | | | 463/16 |
| 2013/0237304 | A1 | * | 9/2013 | Oakes | G07F 17/32 |
| | | | | | 463/16 |
| 2015/0126262 | A1 | * | 5/2015 | Litos | A63F 13/215 |
| | | | | | 463/17 |

* cited by examiner

*Primary Examiner* — Omkar A Deodhar
(74) *Attorney, Agent, or Firm* — Dinsmore & Shohl LLP

(57) ABSTRACT

A process for playing a game includes purchasing a product with an information tag associated therewith, playing a first game associated with the product, scanning the information tag with a portable electronic device (PED) and interacting with at least one gaming website by playing the first game again online, playing a second game online or collecting winnings from playing at least one of the first game and the second game. The product may be a flexible pouch, a cup, a bottle, a beverage can, a beverage glass, a serving tray and a static piece gaming device with a pull tab, scratch off film or peel-off label, a clothing item and a sports memorabilia item.

19 Claims, 4 Drawing Sheets

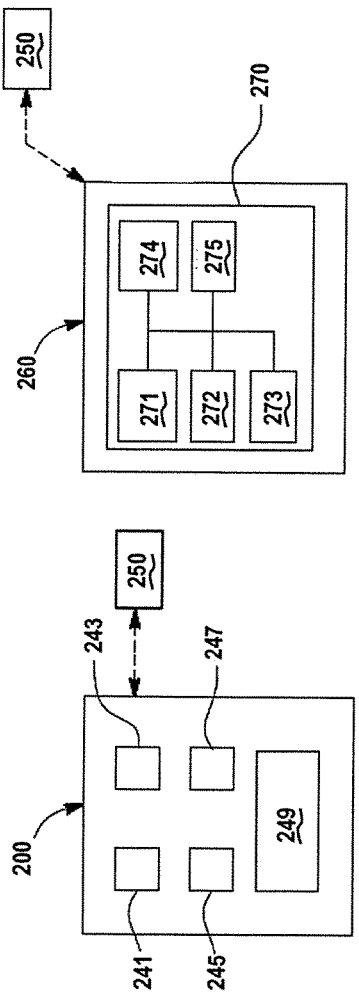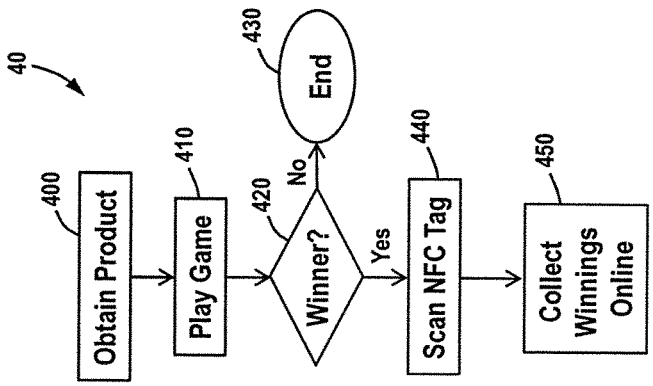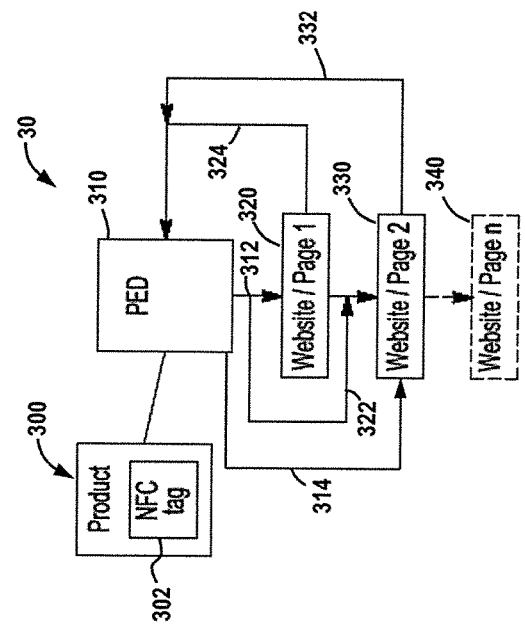
FIG. 3
FIG. 4
FIG. 5
FIG. 6

US 10,417,862 B2

PROCESSES AND SYSTEMS FOR PLAYING GAMES VIA NFC TAG USAGE

RELATED APPLICATION

This application claims priority to U.S. Provisional Patent Application Ser. No. 62/171,298 filed Jun. 5, 2015, the entirety of which is incorporated herein by reference.

TECHNICAL FIELD

The present disclosure is related to processes and system for playing a game and particularly to processes and systems that use an information tag to assist in playing a game.

BACKGROUND

Products with bar codes, quick response (QR) Codes, radio frequency identification (RFID) tags and/or NFC (near field communication) tags are known. Such bar codes, QR Codes, RFID tags and/or NFC tags typically provide information on the product to an electronic scanner or reader which may or may not be in the form of a PED (portable electronic device) such as a smartphone. Playing a game online, e.g. a casino game, is also known. However such playing of a game online requires an individual to specifically direct his/her computer, PED, etc., to an online game website. Accordingly, a process or system that can direct a PED to a gaming website such that a user of the PED can play a game, collect winnings from playing the game, etc., would be desirable.

SUMMARY

A process for playing a game includes purchasing a product with an information tag associated therewith and scanning the information tag with a portable electronic device (PED). In embodiments, the process includes playing a first game associated with the product before scanning the information tag with the PED. In other embodiments, the process includes playing a first game online after scanning the information tag with the PED. The process may include interacting with at least one gaming website by playing the first game online, playing the first game again online, playing a second game online or collecting winnings from playing at least one of the first game and the second game. The product may be a flexible pouch, a cup, a bottle, a beverage can, a beverage glass, a static piece gaming device with a pull tab, scratch off film or peel-off label, a clothing item or a sports memorabilia item. The information tag may be attached to the product. Also, a delivery item for the product, for example, a serving tray, may have the information tag associated with the product. The first game and the second game may be a lottery game, a raffle game, a bingo game, a casino game or a combination thereof, and collection of the winnings from playing at least one of the first game and the second game may include transferring electronic funds to an online account of a user of the PED. The first game and the second game may be played on the same website, or in the alternative, the first game may be played on a first website and the second game may played on a second website.

A system for playing a game is also provided. The system includes a product with an information tag associated therewith, a communication network, a gaming website, and a PED operable to read information from the information tag and be directed to the gaming website via the communication network. The PED, communication network and website are operable to interact with each other such that an online game may be played on the website and winnings from the playing the online game may be collected. The product may be a flexible pouch, a cup, a bottle, a beverage can, a beverage glass, a static piece gaming device with a pull tab, scratch off film or peel-off label, a clothing item and a sports memorabilia item. The information tag may be attached to the product, or in the alternative, a delivery item associated with the product may have the information tag. The online game may be a lottery game, a raffle game, a bingo game, a casino game of a combination thereof.

Additional features and advantages of the process and system for playing a game described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein and together with the description serve to explain the principles and operations of the claimed subject matter.

BRIEF DESCRIPTION OF THE DRAWINGS

FIG. 3 schematically depicts a portable electronic device (PED) according to one or more embodiments shown and described herein;

FIG. 4 schematically depicts various components of a computer with a gaming website according to one or more embodiments shown and described herein;

FIG. 5 schematically depicts a system for playing a game according to one or more embodiments shown and disclosed herein;

FIG. 6 schematically depicts a process for playing a game according to one or more embodiments shown and described herein;

DETAILED DESCRIPTION

Figure 2:
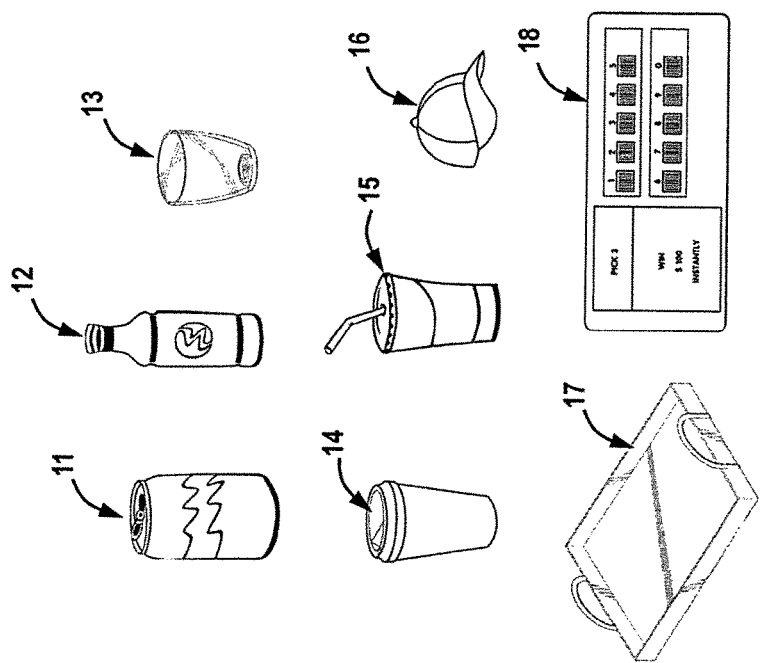
FIG. 2 schematically depicts illustrative products with an information tag (not shown) associated therewith according to one or more embodiments shown and described herein.

Reference will now be made in detail to embodiments of a process and a system for playing a game. Whenever possible, the same reference numerals will be used throughout the drawings to refer to the same or like parts. One embodiment of a process for playing a game is schematically depicted in FIG. 6. The process may include purchasing a product with an information tag associated therewith and playing a game. The product may be a flexible pouch, a cup, a bottle, a beverage can, a beverage glass, a serving tray and a static piece gaming device with a pull tab, scratch off film or peel-off label, a clothing item or a sports memorabilia item and the information tag may be attached to the product. The information tag may be an NFC tag. Also, a delivery item for the product, for example a serving tray for serving the product, may be included and have the information tag associated with the product. Once the product is obtained a game that is part of or accompanies the product is played. If the game is won, a PED scans the information tag associated with the product and winnings of playing the game are collected online. The process also allows for playing the same game again and/or playing a different game online.

For purposes of the instant disclosure, the term "winnings" refers to money, prizes, credits, points, etc., owed to an individual that has won a game. The term "collecting winnings" refers to transferring the winnings to an individual, or to a representative of an individual, that has won a game. The term "website" refers to a location connected to the Internet that maintains one or more website pages on the World Wide Web. The term "website page" refers to a hypertext document connected to the World Wide Web. The term "online" refers to being connected by computer, PED, etc., to one or more other computers or networks, as through a commercial electronic information service or the Internet. The term "gaming website" refers to a website with online game that is either partially or primarily played through the Internet or another computer network. The term "product" refers to a physical item that may be obtained by an individual. The term "delivery item" refers to an item such as a bag, box, tray, plate, cup, glass, mug, container, etc., which is used to assist in delivering an obtained product to an individual that has obtained the product. The term "communication network" refers to an electronic network that facilitates communication between two electronic devices. The term "communication line" refers to both wired and wireless communication. The term "associated with" refers to attached to or proximate to. The term "gaming website" refers to a website that hosts one or more casino games, gambling games, lottery games, contests, etc., that may be played online.

Unless otherwise expressly stated, it is in no way intended that any process set forth herein be construed as requiring that its steps be performed in a specific order, nor that with any system specific orientations be required. Accordingly, where a process claim does not actually recite an order to be followed by its steps, or that any system claim does not actually recite an order or orientation to individual components, or it is not otherwise specifically stated in the claims or description that the steps are to be limited to a specific order, or that a specific order or orientation to components of a system is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Figure 1:
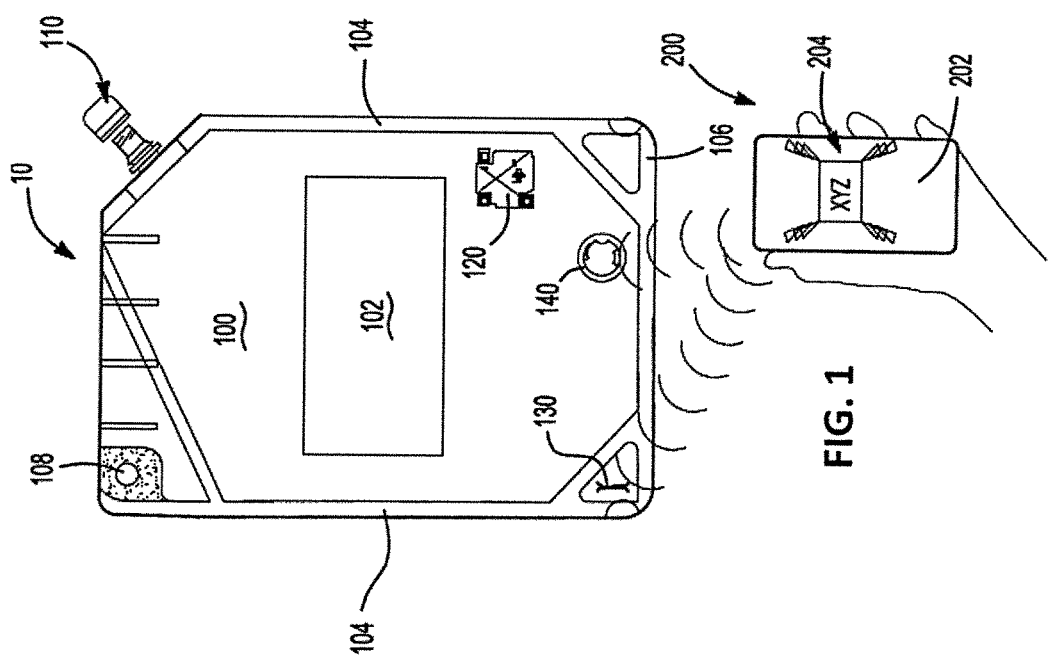
FIG. 1 schematically depicts a flexible pouch having an information tag in the form of a QR code, an RFID tag and/or an NFC tag according to one or more embodiments shown and described herein.

Turning now to FIG. 1, an embodiment of a product according to embodiments of the present disclosure is shown generally at reference numeral 10. The product 10 is in the form of a pouch and can have a side panel 100, at least one side seam 104, and one or more end seams 106. The pouch may or may not have a label 102, an aperture 108 for hanging the pouch, and/or a fitment 110 for removal of a product contained within the product 10.

The product 10 has a bar code (not shown), QR code 120, RFID tag 130 and/or NFC tag 140. The RFID tag 130 and/or NFC tag 140 can be attached to a surface of the product 10 and may or may not be laminated, i.e. be located between a side panel 100 and an overlying laminate layer. In the alternative, the RFID tag 130 and/or NFC tag 140 can be attached or printed to the side panel 100 using an adhesive or ink, or placed and located within the product 10. It is appreciated that the RFID tag 130 and/or NFC tag 140 can be located within an air pocket 132, the air pocket 132 affording better reception to and transmission from the RFID tag 130 and/or NFC tag 140. In addition, if the RFID tag 130 and/or NFC tag 140 is printed and/or placed onto a flexible pouch having a foil layer that is at least part of the side panel 100, an insulating layer 103 can be present between the RFID tag 130 and/or NFC tag 140 and the side panel 100. In this manner, the tag can be insulated from the foil layer and improved communication with the tag is afforded. Also, the insulating layer 103 can be made from any insulting material known to those skilled in the art, illustratively including an electrically insulating tape layer, electrically insulating paint layer, electrically insulating paper layer and/or Still referring to FIG. 1, a PED 200 with a screen 202, an RFID and/or NFC tag reader transmitting a signal to the RFID tag 130 and/or that NFC tag 140 may be included. For example, if the RFID tag 130 and/or NFC tag 140 is a passive RFID tag and/or passive NFC tag, then a signal from the reader 220 is required. However it is appreciated that if the RFID tag 130 and/or NFC tag 140 is an active tag, then the reader 220 can simply receive a signal from the RFID or NFC tag. Assuming the RFID tag 130 and/or NFC tag 140 is a passive tag, and upon activation of the RFID tag 130 and/or NFC tag 140, the RFID tag 130 and/or NFC tag 140 provides a signal to the PED 200, which may or may not be converted and/or displayed as information 204 on the screen 202. For example, the information 204 can be in the form of specific URL and/or a specific URL plus tag identifier associated with the pouch. It should be appreciated that the PED 200 may scan the QR Code 120 and display information 204 from the QR Code 120 on the screen 202.

Turning now to FIG. 2, a plurality of illustrative products are shown. Particularly, a beverage can 11, a beverage bottle 12, a beverage glass 13, a hot beverage cup 14, a cold beverage cup 15, a clothing cap 16, and a game ticket 18 are shown. A delivery item in the form of a tray 17 is also shown. It should be appreciated that other products such as food items, sports memorabilia, sporting goods items, jewelry items, clothing items, etc., may be included within the scope of the instant disclosure. Each of the products 11-16, 18 and/or delivery item 17 may have a QR code 120, RFID tag 130 and/or NFC tag 140 associated therewith. For example, a QR code 120, RFID tag 130 and/or NFC tag 140 may be directly printed onto one or more of the products 11-16, 18 and/or delivery item 17, be attached via a tether, be attached with an adhesive or separately accompany one or more of the products 11-16, 18 and/or delivery item 17.

The PED 200 can have one or more components as illustrated in FIG. 3. For example, the PED 200 can have a bar code scanner/reader 241, a QR code scanner or reader 243, an RFID tag reader or scanner 245, and/or an NFC tag scanner or reader 247. In addition, the PED 200 can have a software module 249 that communicates with the components 241-247 and directs communication with a communication network 250 and one or more websites (FIG. 5).

The website may be on a computer 260 with a processing unit 270 as illustrated in FIG. 4. The processing unit 270 may include memory 271, a software module 272, a communication module 273, and other processing unit components 274, 275 in electronic communication with each other. The computer 260 may be in electronic communication with the communication network 250.

Referring now to FIG. 5, a system for playing a game is shown generally at reference numeral 30. In embodiments, the system 30 includes a product 300 with an NFC tag 302, a PED 310 and one or more websites 320, 330, 340. The NFC tag 302 may be scanned or read by the PED 310. Thereafter the PED 310 may be directed to a first website 1 and/or website page 1 320 (shown as "Website/Page 1" in FIG. 5) via a communication line 312. The first website 1 and/or website page 1 320 may transmit information back to the PED 310 via communication line 324. The ID of the PED 310, product information on the product 300, results of having played a game associated with the product 300, etc., may be transmitted to the first website 320. In the alternative, or in addition to, product information on the product 300, information of winnings for the game associated with the product 300, information on playing the game associated with the product 300 again, information on playing a different game, etc., may be transmitted to the PED 310 from the first website 320. After being directed to the first website 1 and/or website page 1 320, the PED 310 may be directed to a second website 2 and/or website page 2 330 (shown as "Website/Page 2" in FIG. 5), a third website and/or website page, a fourth website and/or website page, etc. (illustrated by "Website/Page n" at 340 in FIG. 5). It should be appreciated that the PED 310 may be directed to the second website 2 and/or website page 2 330 via communication line 314 or 322 without first being directed to the first website and/or website page 1 320, and the second website and/or website page 2 330 may transmit information to the PED 310 via communication line 332. It should also be appreciated that the first website 1 and/or website page 1 320, second website 2 and/or website page 2 330 and/or the nth website n and/or website page n 340 may be a gaming website.

In embodiments, one or more of the websites and/or website pages 320-340 require a user of the PED 310 to provide registration information before proceeding with playing a game, collecting winnings, etc. Such registration information can include but not be limited to the user's name, age, sex, home address, credit card information and the like. Once the individual has entered the appropriate registration information, if required, one or more of the websites and/or website pages 320-340 may interact with the user of the PED 310 such that the user may play a first game, collect winnings from playing a first game, continue playing the first game, play a second game, etc.

Referring to FIG. 6, a process for playing a game is shown generally at reference numeral 40. In embodiments, a product with an NFC tag associated therewith is obtained at step 400 and a game is played at step 410. It should be appreciated that the product may be obtained by purchasing the product, receiving the product as a gift, receiving the product as part of a sales or marketing promotion, etc. The game is associated with the product and may be a lottery game, a raffle game, a bingo game, a casino game, etc. For example, the game may be a scratch-off lottery game, a peel-off lottery game, etc. Whether or not the game played is a winner, e.g. a prize has been won, is determined at step 420. If the game played is not a winner, then the process stops at step 430. In the alternative, if the game is a winner, the NFC tag is scanned with a PED at step 440 and the PED is directed to at least one website and the winnings of the game played are collected at step 450. In the alternative, the at least one website instructs a user of the PED where the winnings of the game may be collected, e.g. at a cashier's desk, a prize station, a retail outlet, etc.

Figure 7:
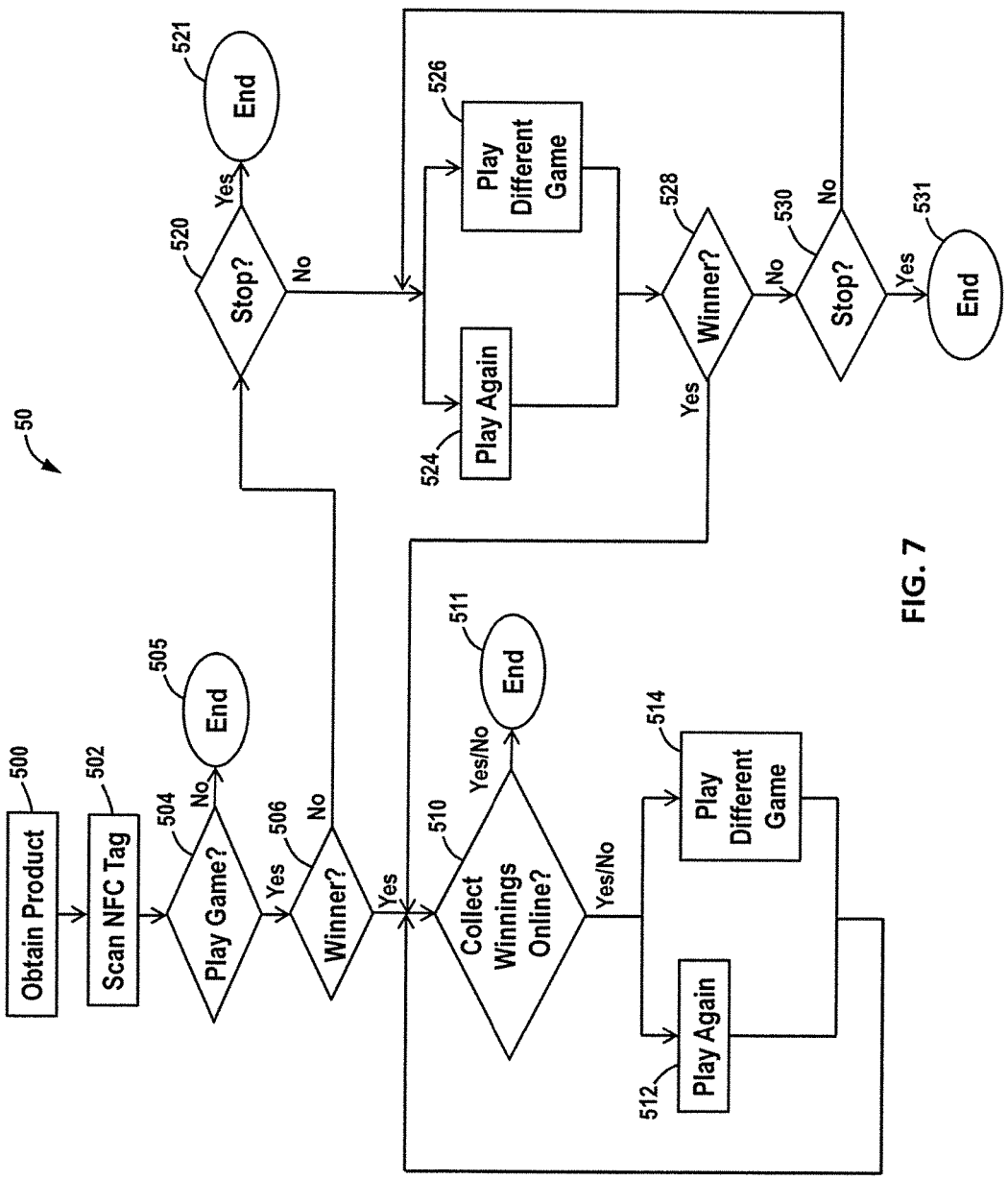
FIG. 7 schematically depicts a process for playing a game according to one or more embodiments shown and described herein.

Referring to FIG. 7, another process for playing a game is shown generally at reference numeral 50. In embodiments, a product with an NFC tag associated therewith is obtained at step 500. The NFC tag is scanned with a PED at step 502 and the user of the PED is directed to at least one website. After being directed to the at least one website, the user of the PED is provided the opportunity to play a first game at step 504. If the user of the PED chooses not to play the first game at step 504, the process ends at step 505. If the user of the PED chooses to play the first game at step 504, the first game is played and whether or not the game is a winner is determined at step 506. It should be appreciated that registration information as described above may or may not be required before playing the first game. If the game is determined to be a winner at step 506, the user is provided with an option to collect winnings from the first game at step 510. The winnings may be collected online, e.g. via an electronic transfer of funds to an online account, back to a credit card, debit card, etc., or in the alternative, the winnings may be collected at a cashier's station, a prize station, a retail outlet, etc.

Whether or not the user of the PED chooses to collect the winnings from the first game (Yes/No), the user may choose to end the process at step 511, i.e. the user of the PED may collect the winnings from the first game and end the process at step 511 or the user of the PED may not collect the winnings from the first game and end the process at step 511. In the alternative, whether or not the user of the PED chooses to collect winnings from the first game (Yes/No), the user of the PED may choose to play the first game again at step 512 or play a second game (shown as "Different Game" in FIG. 7) at step 514, i.e. the user of the PED may collect the winnings from the first game and choose to play the first game again at step 512 or play the second game at step 514, or the user of the PED may not collect the winnings from the first game and choose to play the first game again at step 512 or play the second game at step 514. After the user of the PED chooses to play the first game again at step 512 or play the second game at step 514, the process returns to step 510 where the user of the PED chooses whether or not to collect winnings from playing the first game, playing the first game again, playing the second game, etc. This process continues until the user decides to end the process at step 511.

Still referring to FIG. 7, if the game is determined not to be a winner at step 506, the process 50 proceeds to step 520 where the user of the PED chooses whether or not to stop the process. If the user of the PED chooses to stop the process at step 520, then the process ends at step 521. If the user of the PED chooses not to the stop the process at step 520, then the user may choose to play the first game again at step 524 or play a second game (shown as "Different Game" in FIG. 7) at step 526. The process determines if the first game played again at step 524 or the second game played at step 526 was a winner at step 528. If the first game played again at step 524 or the second game played at step 526 is a winner, then the process proceeds to step 510 where the user of the PED may choose whether or not to collect winnings from the first game played again at step 524 or the second game played at step 526. After the user of the PED chooses whether or not to collect winnings from the first game played again at step 524 or the second game played at step 526, the process proceeds to step 511, 512 or 514 as described above. If the first game played again at step 524 or the second game played at step 526 is not winner, then the process proceeds to step 530 where the user of the PED may choose whether or not to stop the process. If the user of the PED chooses to stop the process at step 530, the process ends at step 531. If the user of the PED chooses not to stop the process at step 530, then the process proceeds back to step 524 or 526 as discussed above. Although embodiments described in FIG. 7 illustrate playing a first game and a second game, it should be appreciated that embodiments disclosed herein include choices of playing a third game, a fourth game, etc.

Figure 8:
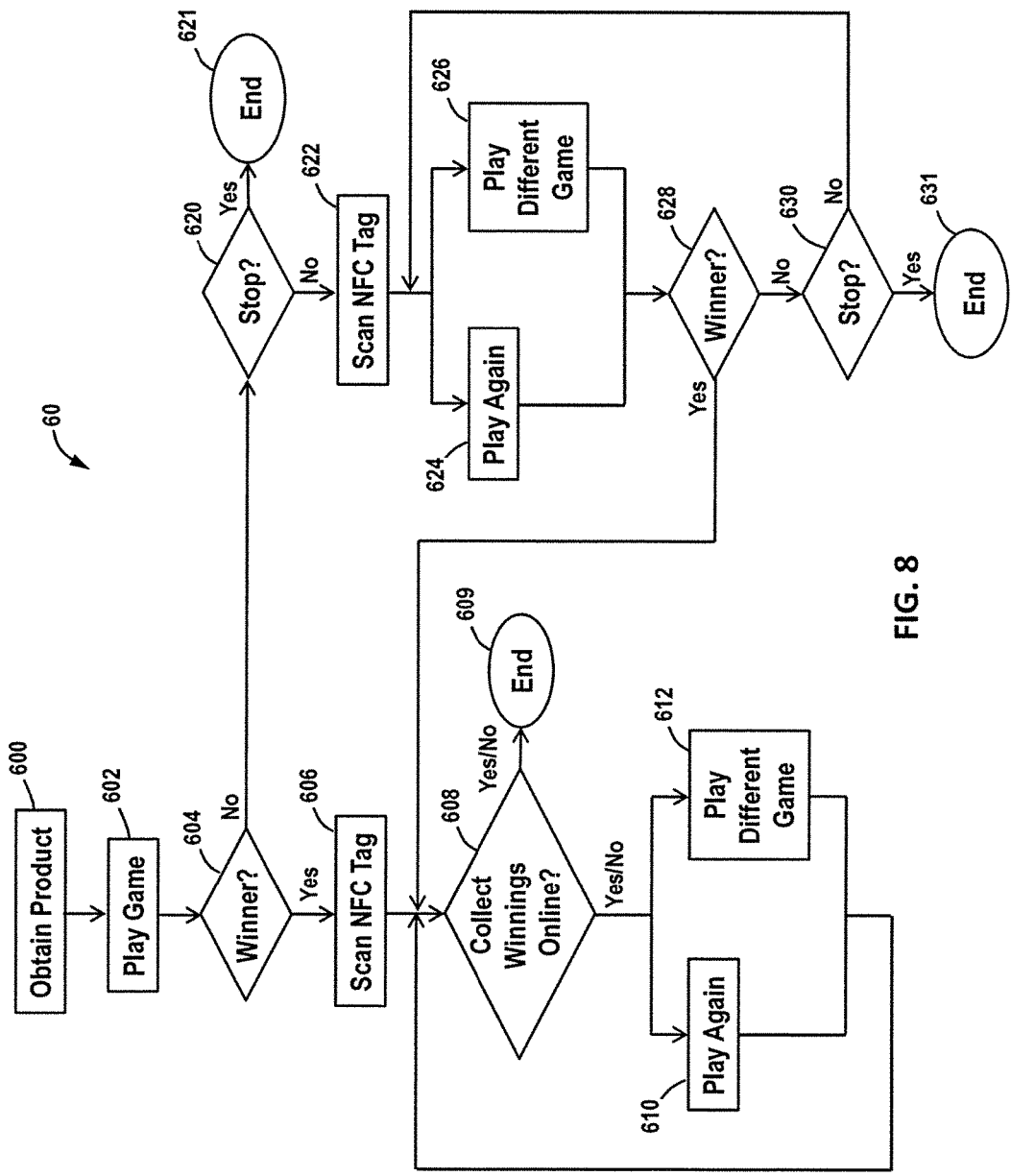
FIG. 8 schematically depicts a process for playing a game according to one or more embodiments shown and described herein.

Referring to FIG. 8, another process for playing a game is shown generally at reference numeral 60. In embodiments, a product with an NFC tag associated therewith is obtained at step 600. A game associated with the obtained product is played at step 602 and whether or not the game is a winner is determined at step 604. If the game played at step 602 is a winner, the NFC tag is scanned with a PED at step 606 and the user of the PED is directed to at least one website. After being directed to the at least one website, the user the user is provided with an option to collect winnings from the first game at step 608. Whether or not the user of the PED chooses to collect the winnings from the first game at step 608 (Yes/No), the user may choose to end the process at step 609, i.e. the user of the PED may collect the winnings from the first game and end the process at step 609 or the user of the PED may not collect the winnings from the first game and end the process at step 609. In the alternative, whether or not the user of the PED chooses to collect winnings from the first game (Yes/No), the user of the PED may choose to play the first game again at step 610 or play a second game (shown as "Different Game" in FIG. 8) at step 612, i.e. the user of the PED may collect the winnings from the first game and choose to play the first game again at step 610 or play the second game at step 612, or the user of the PED may not collect the winnings from the first game and choose to play the first game again at step 610 or play the second game at step 612. After the user of the PED chooses to play the first game again at step 610 or play the second game at step 612, the process returns to step 608 where the user of the PED chooses whether or not to collect winnings from playing the first game, playing the first game again, playing the second game, etc. This process continues until the user of the PED decides to end the process at step 609. If the game is determined not to be a winner at step 604, the process 60 proceeds to step 620 where the user of the PED chooses whether or not to stop the process. If the user of the PED chooses to stop the process at step 620, the process ends at step 621. If the user of the PED chooses not to the stop the process at step 620, then the PED scans the NFC tag associated with the product at step 622 and the PED is directed to at least one website. After being directed to the at least one website, the user is provided with an option to play the first game again at step 624 or play a second game (shown as "Different Game" in FIG. 8) at step 626. The process determines if the first game played again at step 624 or the second game played at step 626 is a winner at step 628. If the first game played again at step 624 or the second game played at step 626 is a winner, then the process proceeds to step 608 where the user of the PED may choose whether or not to collect winnings from the first game played again at step 624 or the second game played at step 626. After the user of the PED chooses whether or not to collect winnings from the first game played again at step 624 or the second game played at step 626, the process proceeds to step 609, 610 or 612 as described above. If the first game played again at step 624 or the second game played at step 626 is not winner, then the process proceeds to step 630 where the user of the PED may choose whether or not to stop the process. If the user of the PED chooses to stop the process at step 630, the process ends at step 631. If the user of the PED chooses not to stop the process at step 630, then the process proceeds back to step 624 or 626 as discussed above. Although embodiments described in FIG. 8 illustrate playing a first game and a second game, it should be appreciated that embodiments disclosed herein include choices of playing a third game, a fourth game, etc.

In order to better provide a teaching of one or more embodiments disclosed herein, but not limit the scope of the disclosure in any way, the following examples are provided.

Referring back to FIG. 3, in one example an individual with the PED 310, e.g. a smartphone, is at an entertainment event such as a sporting event, a casino, a horse race, etc., and obtains a product 300 in the form of a beverage. The product 300 has an NFC tag 302 associated therewith which can be read or scanned by the PED 310. The individual scans or reads the NFC tag 302 with the PED 310 and the PED 310 is directed to and provides the PED ID to the website 1 and/or website page 1 320, which in turn provides product information on the beverage back to the PED 310 as a function of the PED ID. The website 1 and/or website page 1 320 also provides an option to the individual to play a game, e.g. a pick 3 instant lottery game. If selected by the individual, the website 1 and/or website page 1 320 directs the PED 310 to the website 2 and/or website page 2 330 where a request for registration information from the individual is delivered. Upon entry of the appropriate registration information, the website 2 and/or website page 2 330 allows the individual to select 3 lottery numbers, or in the alternative, automatically selects 3 lottery numbers for the individual. In addition, the 3 lottery numbers are compared to a winning set of 3 lottery numbers and the individual is informed by the website 2 and/or website page 2 330 via the PED 310 as to whether or not he/she has won. It is appreciated that the individual can even be awarded a secondary prize, e.g. a free beverage, a food item, etc., if he/she wins or does not win the lottery game. In the event that the individual has won the lottery game, payment information provided by the individual can be used to transfer money back to a credit card, to a debit card, etc., or in the alternative, the individual could receive his/her winnings at a cashier's desk. It is appreciated that the website 2 and/or website page 2 720 can allow for the individual to continue playing one or more games as described in reference to FIGS. 7 and 8. In addition, the PED 310 can be directed to additional websites and/or website pages n as illustrated by the dotted line arrow and dotted line box in FIG. 5.

Still referring to FIG. 3, in another example an individual obtains a product 300 such as a scratch off ticket/card, pull tab ticket/card, peel and reveal ticket/card, etc. Upon scratching off a film, pulling a tab and/or peeling a sticker from the ticket/card, the individual instantly has knowledge as to whether or not he/she has won a gambling event. Thereafter, the individual enters a "second chance to win" by scanning an NFC tag 302 that is attached to and/or is part of the product 300 using a PED 310. Upon scanning the NFC tag 302, the PED 310 is directed to the website 1 and/or website page 1 320, as discussed above, which in turn directs the PED and the individual to the website 2 and/or website page 2 330 as discussed above. In the alternative, the PED is directed straight to the website 2 and/or website page 2 330. In this manner, the individual can have a second chance to win a prize, money, etc., even if he/she did not win initially. In the event that the individual has won the lottery game, payment information provided by the individual can be used to transfer money back to a credit card, to a debit card, etc., or in the alternative, the individual could receive his/her winnings at a cashier's desk.

In addition to the above, the individual can also get access to a wide range of social media applications as well as access to various audio and visual media applications. Also, game cards can become talking game pieces. Furthermore, non-for-profit organizations such as the Red Cross, FEMA, etc., can use the game cards for fundraising purposes, linking the consumer to local causes and the like.

The disclosure is not to be limited to the described embodiments herein, but it should be appreciated that one skilled in the art would make various changes, modifications, etc. and still fall within the scope of the disclosure. As such, the specification and the drawings should be interpreted broadly.

The invention claimed is:

1. A process for playing a game comprising:
purchasing a product with an information tag associated therewith;
playing a first game associated with the product;
then determining whether the first game associated with the product is a winner;
then scanning the information tag with a portable electronic device (PED) when the first game associated with the product is the winner;
determining whether to collect winnings online; and
then interacting with at least one gaming website by playing the first game again when the first game associated with the product is a winner.

2. The process of claim 1, wherein the product is at least one of a flexible pouch, a cup, a bottle, a beverage can, a beverage glass, a serving tray and a static piece gaming device with a pull tab, scratch off film or peel-off label, a clothing item and a sports memorabilia item.

3. The process of claim 2, further comprising a delivery item for the product, the delivery item having the information tag associated with the product.

4. The process of claim 3, wherein the delivery item is a serving tray.

5. The process of claim 1, wherein the information tag is an NFC tag.

6. The process of claim 1, wherein the first game and the second game are selected from the group consisting of a lottery game, a raffle game, a bingo game and a casino game.

7. The process of claim 1, wherein the collecting winnings online further comprises transferring electronic funds to an online account of a user of the PED.

8. The process of claim 1, wherein the playing the first game again is played on a first website and playing the second game is played on a second website.

9. A process for playing a game comprising:
purchasing a product with an information tag associated therewith and playing a first game associated with the product;
determining whether the first game associated with the product is not a winner;
prompting the user to determine whether to stop if the first game associated with the product is not the winner;
scanning the information tag with a portable electronic device (PED), the PED directed to at least one gaming website from information obtained from the information tag;
interacting with the at least one gaming website by playing the first game again.

10. The process of claim 9, wherein the product is at least one of a flexible pouch, a cup, a bottle, a beverage can, a beverage glass, a serving tray, a clothing item and a sports memorabilia item.

11. The process of claim 10, further comprising a delivery item for the product, the delivery item having the information tag associated with the product.

12. The process of claim 11, wherein the delivery item is a serving tray.

13. The process of claim 9, wherein the information tag is an NFC tag.

14. The process of claim 9, wherein the first game and the second game are selected from the group consisting of a lottery game, a raffle game, a bingo game and a casino game.

15. The process of claim 9, wherein the collecting winnings online further comprises transferring electronic funds to an online account of a user of the PED.

16. The process of claim 9, wherein the first game is played on a first website and the second game is played on a second website.

17. The process of claim 1 further comprising:
then determining whether the first game associated with the product is not a winner;
then scanning the information tag with a portable electronic device (PED) when the first game associated with the product is not the winner; and
then interacting with at least one gaming website by playing the first game again when the first game associated with the product is not a winner.

18. The process of claim 17 further comprising:
then interacting with at least one gaming website by playing a second game when the first game associated with the product is a winner.

19. The process of claim 9 further comprising:
interacting with the at least one gaming website by playing the first game again, playing a second game online when the first game is not a winner and collecting winnings online from playing the first game and the second game; and
interacting with the at least one gaming website again by collecting winnings online when at least one of the first game and the second game is a winner and/or playing at least one of the first game again or playing the second game again.

* * * * *